(12) United States Patent
Levan

(10) Patent No.: US 6,675,744 B1
(45) Date of Patent: Jan. 13, 2004

(54) MOOD COLLAR FOR PETS

(76) Inventor: Michele Levan, No. 8A1, Philadelphia, PA (US) 19102

( * ) Notice: Subject to any disclaimer, the term of this patent is extended or adjusted under 35 U.S.C. 154(b) by 309 days.

(21) Appl. No.: 09/586,312

(22) Filed: Jun. 2, 2000

(51) Int. Cl.[7] ............................................... A01K 27/00
(52) U.S. Cl. ....................................................... 119/858
(58) Field of Search .............................. 119/856, 858; 428/1.5; 116/207; D30/152

(56) References Cited

U.S. PATENT DOCUMENTS

| 3,677,088 A | * | 7/1972 | Lang | 374/159 |
| 3,802,945 A | * | 4/1974 | James | 428/1.5 |
| 3,871,336 A | * | 3/1975 | Bergman | 119/858 X |
| 4,220,016 A | | 9/1980 | Frenger | |
| 4,428,321 A | * | 1/1984 | Arens | 116/217 |
| 5,813,766 A | | 9/1998 | Chen | |

FOREIGN PATENT DOCUMENTS

| GB | 2188524 | * | 10/1987 | 119/858 |

* cited by examiner

*Primary Examiner*—Robert P. Swiatek
(74) *Attorney, Agent, or Firm*—Robert Platt Bell

(57) ABSTRACT

A decorative animal collar having "mood stones" which are in contact with the body of a pet. Specifically, the invention is directed to an animal collar containing encapsulated or artificial stones containing cholesteric liquid crystals called "mood stones" that can identify the mood of an animal based on changes in body temperature.

1 Claim, 2 Drawing Sheets

MOOD COLLAR FOR PETS

FIELD OF THE INVENTION

The present invention is directed to an animal collar which can identify the emotional mood of a pet. More specifically, the invention is directed to an animal collar containing encapsulated cholesteric liquid crystals called "mood stones" that can identify the mood of an animal based on changes in body temperature.

BACKGROUND OF THE INVENTION

Animal health awareness is a major concern of animal lovers today. Concerns for the health of animals became prevalent with the increased amount of domestic pets in modern households. Pets for companionship cause tremendous emotional bonds to form between pets and their owners. With the formation of these bonds, comes a new awareness for the physical and emotional health of these pets. Presently, 60% of American households own pets with a majority of owners claiming a parental type relationship with their pets.

The cost of veterinarian care for domestic pets makes it imperative for responsible pet owners to engage in preventive medicine for the care of their pet much like they do for themselves. This care should include both physical and emotional disorders. In the past, animal care has been restricted to basic nutrition, shelter, worming, spading, et. However, the increase in domestic pets has caused an awareness of emotional problems that can escalate into physiological problems. For example, the increased amount of time pets must spend alone due to dual income households has caused an increased diagnosis of Animal Separation Disorder. This disorder, based on the emotional stress of pets longing for his parental type owner, usually manifests as destructive animal behavior. Characteristically, pets damage or destroy the homes in which they remain for long periods of time incurring substantial repair costs in addition to medical treatment costs for the pet which injures itself. More importantly, these types of emotional disorders can lead to physiological problems relating to the heart or nervous system. As the disorder continues to progress, the physiological and emotion state of the pet rapidly deteriorates. These types of problems are routinely blamed on obedience rather than a serious emotional problem with the pet. At present, there is no simple or easy invention that can detect emotional trauma of house pets.

The prior art most closely related to the present invention are the many varied forms of devices which identify changes in the physiological changes in people. U.S. Pat. No. 5,813,766 ('766) discloses a finger temperature indicator that measures the finger temperature of the wearer. The device of the '766 patent includes a thermal conductive rod made of a highly thermal conductive material inserted into a ring with the lower end of the rod exposed from the ring to contact the finger of the wearer. The temperature of the finger is accurately and quickly transmitted to a thermistor provided with the ring via the thermal conductive rod, causing a circuit connector to the thermistor to operate and convert the finger temperature into a signal which is sent to an indicating element in the ring. With a switch button, the signal can be presented to the wearer in different manners, thereby the wearer is reminded and encouraged to discontinue the physical or mental stress. This device can be quite expensive and would not be easily applied to any location of the body of a pet.

U.S. Pat. No. 4,220,016 ('016) discloses decorative jewelry for people which can be attached by use of a flexible or resilient pad secured to the opposite side of the decorative portion of the jewelry. The decorative portion, may be a precious stone or an artificial stone which, in one embodiment, may change color in response to the heat transferred from the wearer. The '016 device uses the same type of stone as the "mood rings" prevalently marketed two decades ago.

The adhesive necessary in this device would make its use on animals impossible due to the amount of hair or fur present on the bodies of most house pets.

Accordingly, a need exists for a device that displays changes rapidly with the emotions of the pet, can be comfortably attached and is inexpensive and accurate. This has not heretofore been achieved in the art.

SUMMARY OF THE INVENTION

The invention is directed to a decorative animal collar having "mood stones" which are in contact with the body of a pet. Specifically, the invention is directed to an animal collar containing encapsulated or artificial stones containing cholesteric liquid crystals called "mood stones" that can identify the mood of an animal based on changes in body temperature.

Cholesteric liquid crystals are generally long molecules with a stiff center consisting of two or more ring structures. On one end is a hydrocarbon chain, the other end is a polar or non-polar head group. "Mood stones" or encapsulated artificial stones containing cholesteric liquid crystals have the ability to change color based on the parallel arrangement of the molecules which form thin layers in the crystal. Cholesteric liquid crystals can be aligned in different ways by changes in temperature. As the temperature of the pet increases, most likely due to increased respiration based on an emotional change, the molecules "tighten" or "twist", thereby defining the wavelength of the visible light reflected from the crystal changing the color of the "mood stone". Thus, an observer can quickly and accurately determine the range of change in the emotional state of the animal by the change in the color of the "mood stone". The color of the "mood stones" will range from black to brown to green to blue-green to blue when the animal's moods or emotions range from physical or emotional stress to calm and relaxed.

The "mood stones" are exposed to the body of the pet on the interior side of the collar and attached to the collar by metal component or other suitable means. The collar is made of any suitable material currently being marketed and secured by a buckle type fastener.

In a preferred embodiment for smaller animals, called "moody cat", the device comprises a ½ inch width leather collar of varied length having a break away elastic segment and a buckle-type fastener with a plurality of size holes. Three to five "mood stones" are attached to the collar each having an exposed body contact area.

In a preferred embodiment for larger animals, called "moody dog", the device comprises a 1 inch width leather collar of varied length having a metal buckle with a plurality of sizing holes for fastening. Four to five "mood stones" are fastened to the collar each having an exposed body contact area.

DETAILED DESCRIPTION OF THE PREFERRED EMBODIMENTS

Figure 1:
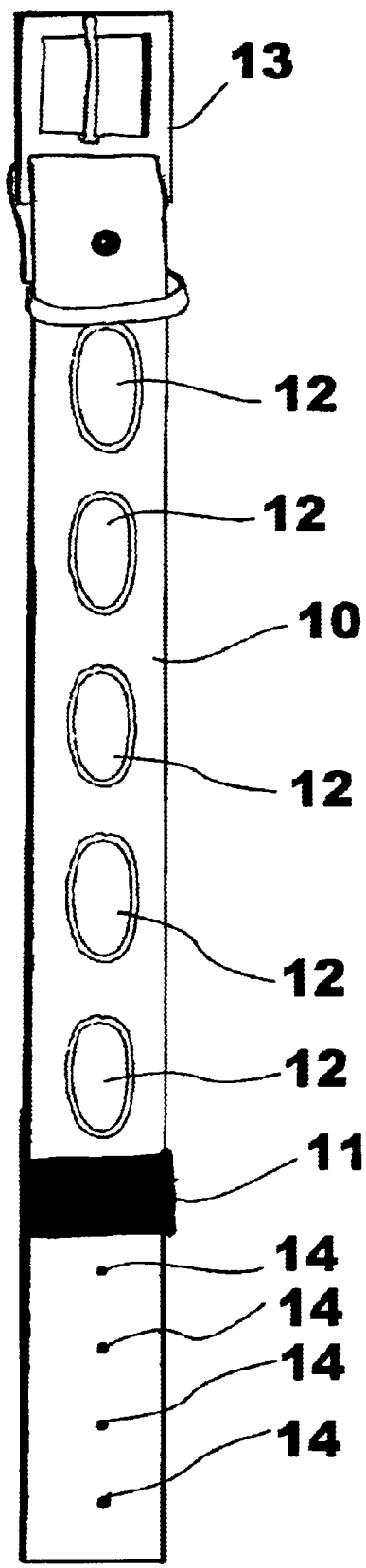
FIG. 1 illustrates the exterior side of the embodiment of the collar on a cat.

FIG. 1 shows the exterior side of the "moody cat" collar embodiment directed to smaller animals. The leather collar (10) is ½ inch wide and contains a break away elastic segment (11) for animal safety this embodiment contains from 3 to 5 "mood stones" (12) each contacting the body of the animal on the interior side of the collar. Cholesteric liquid crystals are generally long molecules with a stiff center consisting of two or more ring structures. On one end is a hydrocarbon chain, the other end is a polar or non-polar head group. "Mood stones" or encapsulated/artificial stones containing cholesteric liquid crystals have the ability to change color based on the parallel arrangement of the molecules which form thin layers in the crystal.

As the body temperature of the animal increases, the temperature of the cholesteric liquid crystals (12) changes causing a physical modification of the molecules. The physical modification or "twisting" changes the wavelength of visible light reflected from the "mood stones". The range of emotional change, based on changes in body temperature, corresponds to the color changes of the "mood stones" (12). The "mood stones" (12) are attached by the metal component to the collar (10). A metal buckle (13) for fastening the collar (10) will eliminate problems of deterioration or discoloring caused by wear. The plurality of sizing holes (14) will ensure a comfortable fit for any animal.

Figure 2:
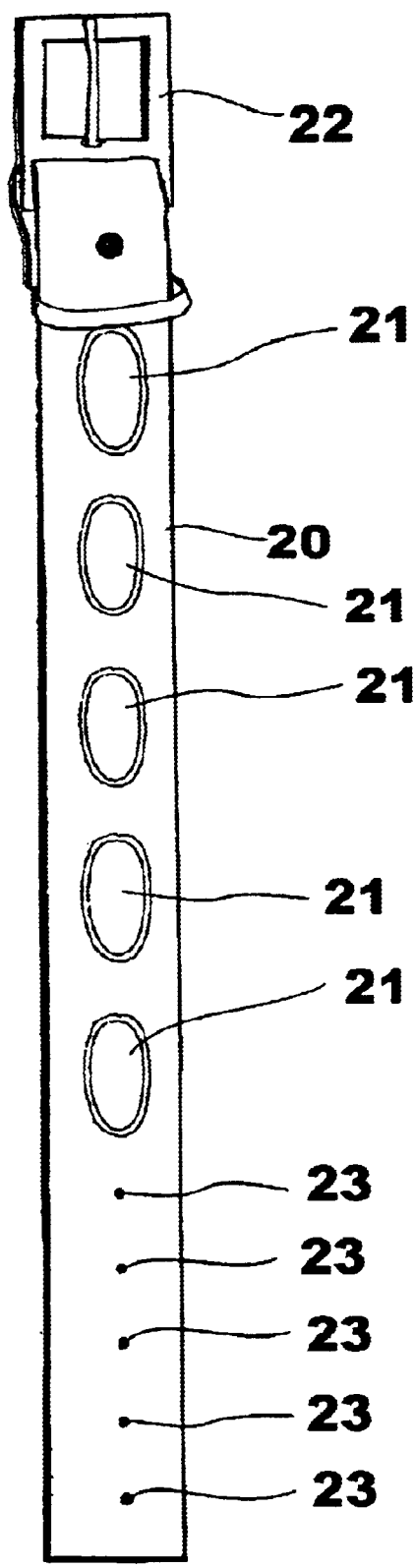
FIG. 2 illustrates the exterior side of the embodiment of the collar on a dog.

FIG. 2 shows the exterior side of the "moody dog" collar embodiment directed to larger animals. The leather collar (20) is 1 inch in width and contains 4–5 "mood stones" (21) each contacting the body of the animal on the interior side of the collar. As the body temperature of the animal increases, the temperature of the "mood stones" (21) changes causing a physical modification of the molecules within the stone. The physical modifications or "twisting" changes the wavelength of visible light reflected from the "mood stones" (21). The range of emotional change, based on body temperature, corresponds to the change in color of the "mood stones" (21). The "mood stones" (21) are attached to the collar (20) by metal component. A metal buckle (22) for fastening the collar (20) will eliminate problems of deterioration or discoloration caused by wear. The plurality of sizing holes (23) will ensure the comfortable fit of any size animal.

The present invention has been described with reference to the above discussed preferred embodiment. It is to be appreciated that other embodiments fulfill the spirit and scope of the present invention.

What is claimed is:

1. A decorative animal collar comprising:

a collar member for surrounding the neck of an animal and having releasable fastener means at the ends of said member; and at least one cholesteric stone embedded in the collar along its longitudinal axis and each of said at least one cholesteric stone able to contact the animal on the interior side of the collar and which can change color based upon the change of temperature of the animal.

* * * * *